United States Patent [19]
Larsen

[11] Patent Number: 5,988,219
[45] Date of Patent: Nov. 23, 1999

[54] HYDRANT MULTI-PORT DIVERTING VALVE

[76] Inventor: Dana P. Larsen, 2758 N. Las Posas Cir., Camarillo, Calif. 93012

[21] Appl. No.: 08/858,105

[22] Filed: May 19, 1997

[51] Int. Cl.⁶ .................................................. F16K 11/02
[52] U.S. Cl. .............................. 137/625.43; 137/625.46; 251/369
[58] Field of Search .......... 137/625.43, 625.44, 137/625.46, 625.47; 251/315.08, 315.09, 315.12, 368, 369

[56] References Cited

U.S. PATENT DOCUMENTS

| | | | |
|---|---|---|---|
| 2,414,966 | 2/1947 | Melichar | 137/625.43 |
| 3,191,628 | 6/1965 | Kirkwood et al. | 137/625.43 |
| 3,762,443 | 10/1973 | Sorenson | 251/368 X |
| 3,841,601 | 10/1974 | Grove et al. | 251/315.09 |
| 4,587,990 | 5/1986 | Pennell et al. | 251/315.12 X |
| 4,774,977 | 10/1988 | Cohen | 137/625.46 X |

*Primary Examiner*—John Fox
*Attorney, Agent, or Firm*—Albert O. Cota

[57] ABSTRACT

A diverting valve for a fire hydrant which has a valve body (20) defining four orifices (28) to which adapter (42) are connected to accept hoses that are directed to a fire and a pumping apparatus. A cylindrical diverter (50) is rotatably disposed within the body and contains a pair of opposed hollow cavities (54) providing a flowpath between adjacent orifices. A lid (84) encloses the valve and a handle (98) affixed upon a stem (52) of the diverter permits manual rotation. The valve is made of lightweight material and the handle is ergonomically shaped.

4 Claims, 3 Drawing Sheets

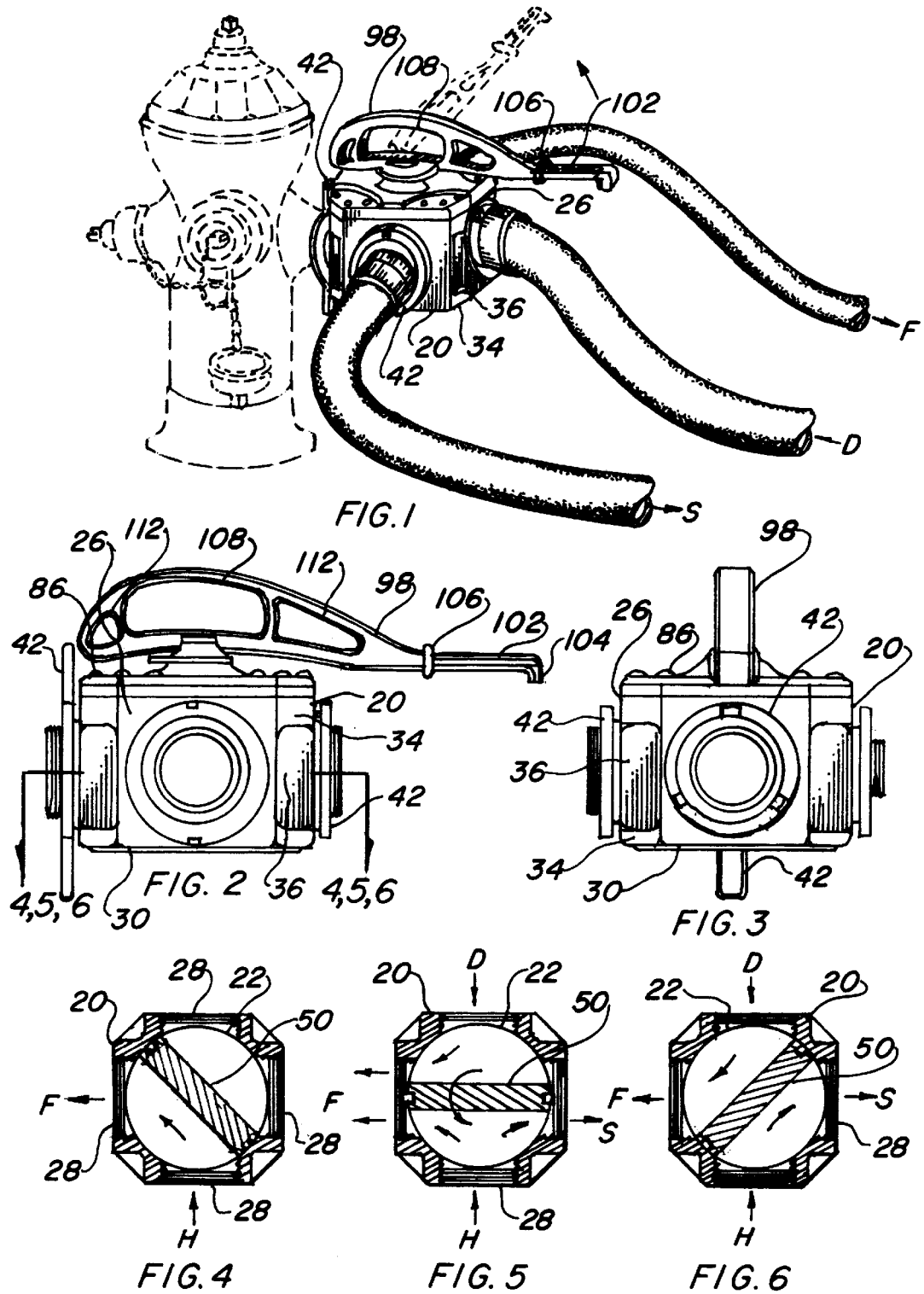

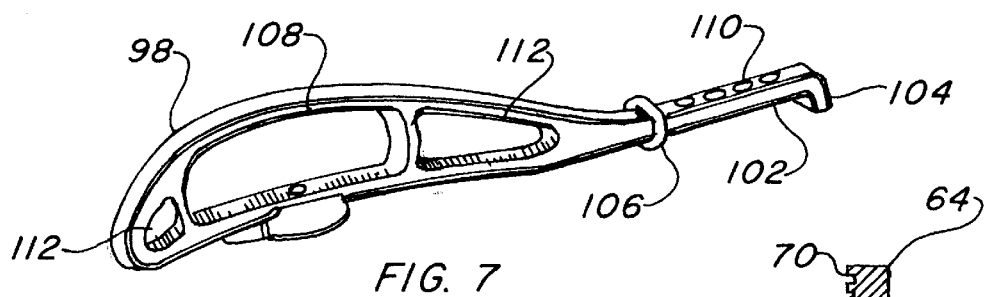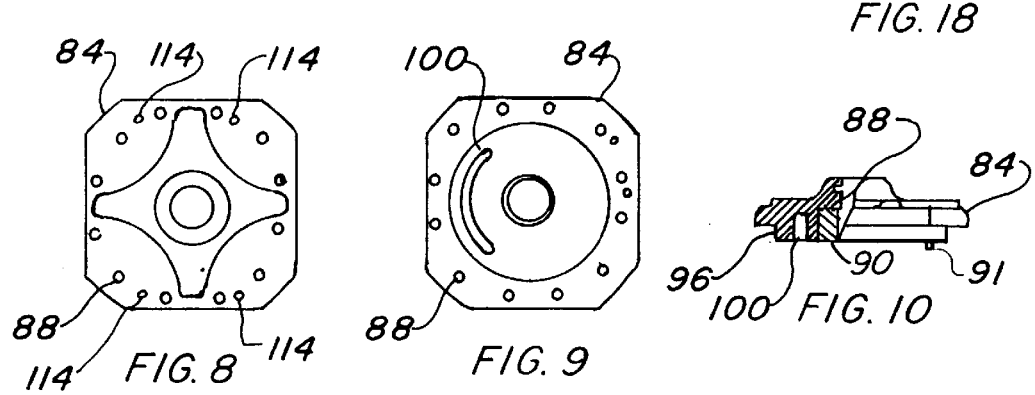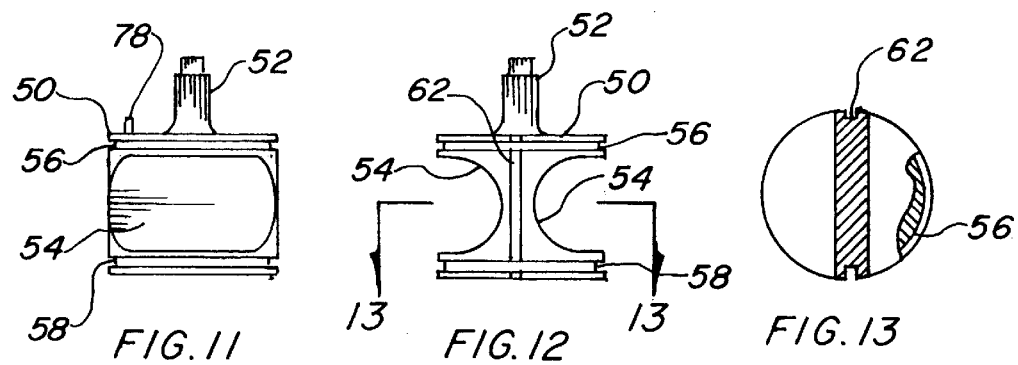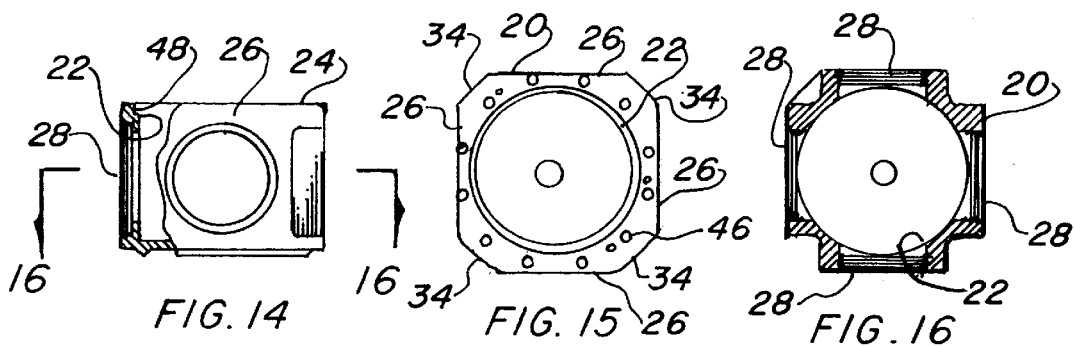

HYDRANT MULTI-PORT DIVERTING VALVE

TECHNICAL FIELD

The invention relates to valves for fire hydrants in general. More specifically to a manually operated valve for a hydrant that permits water flow from the hydrant to a firefighter's hose and diverts the flow to a pumper apparatus without interrupting the flow to the firefighter.

BACKGROUND ART

Ever since man discovered fire he has realized the potential danger that fires constantly present, in addition to the obvious benefits that fires provide. Throughout history fires have been the cause of some of the most destructive and deadly catastrophes that have ever occurred. From the days of the Roman empire, when Mt. Vesuvius erupted and molten ash flowed into and over the city of Pompeii, destroying much of the city, to the great fire of San Francisco in the early 1900's, fire has been proven to be an indiscriminate and very capable destroyer.

Due to fire's constant danger, almost every city in the United States, and most developed countries, provide some sort of firefighting service. Larger cities have fully functioning fire departments, while smaller cities often recruit volunteers to serve as firefighters when the need arises. Also, many specialized tools and various equipment has been designed to assist in fighting fires. One example of this equipment are the specialized valves used to provide water to firemen when they are attempting to extinguish a blaze.

Previously, a few types of four way valves have been used to provide an effective means for fighting fires by permitting a hose to be quickly attached to a fire hydrant and then ultimately through a pumping apparatus. In the past this approach has been limited to a combination of butterfly valves and flapper or swinging check valves. This prior art has been complicated and difficult to understand and restricts flow by the very nature of the type of valve used. Various valves of the low pressure differential type have been developed and are in use to minimize the pressure drop through the valve such as large orifice ball valves and the like.

A search of the prior art did not disclose any patents that read directly on the claims of the instant invention, however the following U.S. patents are considered related:

| U.S. PAT. NO. | INVENTOR | ISSUED |
| --- | --- | --- |
| 5,464,064 | Weingarten | 7 November 1995 |
| 4,373,543 | Brown, et al | 15 February 1983 |
| 4,303,093 | Swingler | 1 December 1981 |
| 3,871,614 | Hughes, et al | 18 March 1975 |
| 3,648,970 | Hartmann, et al | 14 March 1972 |
| 2,836,197 | Johnson | 27 May 1958 |
| 1,937,597 | Schmidt | 5 December 1933 |
| 1,750,927 | Diez | 18 March 1930 |

U.S. Pat. No. 5,464,064, titled Valve Particularly Useful in Fire Extinguishing Systems, invented by Zvi Weingarten, relates to a valve including a valve member having: a predetermined surface area on its inlet side exposed to the inlet pressure to produce a force for moving the valve member to an open position; a larger surface area on its opposite, control side exposed to the inlet pressure produces a larger force moving the valve member to a closed position; a passageway through the valve member; a restrictor orifice in the passageway; and a one-way valve in the passageway permits fluid flow only from the inlet side to the control side of the valve member, thus preventing unintentional opening of the valve member in the event of a drop in the inlet pressure followed by the resumption of the inlet pressure.

U.S. Pat. No. 4,373,543, titled Fire Resistant Seat for Flow Control Valve, invented by Robert J. Brown, et al discloses a flow control valve with a valve closure element provided having at least one annular resilient seat member and an annular flexible metal seat member positioned adjacent to it. The flexible metal seat is held in position by heat resistant gaskets biased against the resilient seat member. Upon the failure of the resilient seat to seal because of melting or deterioration caused by exposure to heat, the flexible metal seat member springs into position providing a fire and heat resistant metal-to-metal seal with the valve closure element.

U.S. Pat. No. 3,871,614, titled Four Way Hydrant Valve, issued to Robert T. Hughes, et al teaches a combined type of valve for controlling water to a fire hose utilizing a main valve chamber with a butterfly valve having an inlet and an outlet for 4½ in ID fire hose. A separate conduit has an inlet and an outlet for 2½ in ID hose with a intermediate opening communicating with the chamber upstream of the butterfly valve. A check valve closes the opening when the pressure at the inlet of the separate conduit exceeds the pressure in the main valve chamber. This prior art requires manual changeover after the pumper has been started therefore producing a higher pressure than available at the fire hydrant.

U.S. Pat. No. 3,648,970 of Hartmann, et al entitled Handle Assembly for a Rotatable Ball Valve discloses a handle assembly with a notched latch plate locking the handle to the housing as a detent element. The latch pin includes several notches for specific valve positions corresponding to selected valve settings.

Johnson's U.S. Pat. No. 2,836,197 titled Zone-Controlled Heating System utilizes a flat swinging valve member for diverting heating fluid to a specific portion of a heating system in a proportioned manner.

U.S. Pat. No. 1,937,597 issued to Schmidt titled, Valve, is for a diverting valve using exhaust gas as the fluid and an opposed pair of spring loaded swinging valve members controlling the flowpath.

U.S. Pat. No. 1,750,927 of Diez titled Fire Hose Connector Head teaches a manually operated valve that permits flow through a flapper valve to a firefighter's hose. When a pumper is connected to the valve, the flow may be directed to the pump and the higher pressure discharge stream is introduced to the back side of the flap valve maintaining closure as long as the pressure is higher on the pump side.

For background purposes and as indicative of the art to which the invention relates reference may be made to the patent issued to Swindler in U.S. Pat. No. 4,303,093.

DISCLOSURE OF THE INVENTION

When a fire company responds to a fire that is large enough to require the utilization water from a fire hydrant, time is extremely important and the sooner water is brought into play, the loss of life and property is greatly reduced. It is therefore the primary object of the invention to provide the largest amount of available water from a hydrant in the minimum amount of time, while still allowing a pumping fire fighting apparatus to be connected to the same hydrant without affecting the firefighter. In many cases time is lost as a pumper must be connected to the hydrant first and then the firefighting hose from the pumper requiring time and coordinated effort. The instant invention circumvents this endeavor by permitting a smaller firefighting hose to be immediately attached to the hydrant using the inventive diverting valve. This procedure permits sufficient time to be spent connecting a larger hose to the supply or suction side of the pump and finally attaching a similar discharge hose from the pump to the valve.

When the pump is started and regulated properly, the diverting valve may then be manually rotated directing the water flow from the pumper to the firefighter's hose without interrupting the flow. This changeover is accomplished by the make-before-break action of the valve as ports are initially opened between the hydrant and the firefighter's hose and during the interim transition when rotating the valve, both the hydrant and pump discharge are in communication with each other. This action makes a smooth switchover leaving the water stream directed on the fire uninterrupted. The valve then diverts the water from the hydrant to the pumper and the firefighter's hose is then in direct flow contact with the discharge of the pump allowing additional water pressure to increase the volume, flowpath distance and intensity of the stream.

An important object of the invention is the ease of handling the valve, as firemen must quickly carry the valve from the fire apparatus to the hydrant and connect them together with minimum effort and dispatch. The valve body has radiused corners and recessed corner hand holds for safe and comfortable handling, and the body includes a flat bottom with a raised ring rub rail to easily sit on a flat surface and protect the bottom from scuffing. The raised neck on the valves lid creates a smooth transition into the handle bosses keeping the joint clean and improving the aesthetics.

The basic valve, as described in the preferred embodiment, is made of lightweight anodized aluminum and teflon coated to inhibit corrosion and resist wear therefore the preferred valve assembly weighs only 29 pounds (13.2 Kg). The handle is ergonomically shaped to fit the hand when both carrying and operating the valve, further, its length affords easy manipulation throughout the handle are corresponding to the normal operating pressure range. The handle shape protects the valve body and also functions much like a roll bar if dropped or mishandled. The handle includes a cutout that is substantially located in the center of gravity making the valve easy to carry and its shape acts as a pointer. Further, the simplicity of design and the fact that one may visualize the valve position between ports makes the direction of flow easy to understand. A stop with a machined channel in the lid enclosing a steel pin limits the handle travel to the exact position.

Another object of the invention is the simple and time tested method of maintaining a hermetic seal within the valve using o-rings to seal the lid to the body and diverter to its contiguous surfaces. It has been found that the diverter valve, will sustain a proof pressure of 5 times the working pressure which is 300 pounds per square inch (2,068.5 Kpag). A second type of seal is used on the diverter. This seal consists of a wiper seal made of a hard thermoplastic material which conforms to the radius of the internal chamber of the body. The seal uses water pressure and the resilience of longitudinal silicone compression cords to afford a hermetic seal between the diverter and body. Further, the diverter is encapsulated with a thermoplastic resin, such as TEFLON® so as to avoid metal-to-metal contact and increase the life of the valve. Two TEFLON® washers, one on the top and one on the bottom of the diverter, assure this metal isolation and act as thrust washers.

Still another object of the invention is the minimal water pressure differential through the valve. This pressure drop is minimized through the use of the diverter having the same diameter as the ports and being at adjacent locations. Since no reducing orifice is used, the turbulence caused by the directional change produces only negligible pressure losses from the uninterrupted laminar flow of the hose. The valve design permits water to flow from either direction, increasing its flexibility in firefighting. In the past, the use of a diverting valve would decrease the hydrant's capabilities, however, the instant invention eliminates this problem by basically eliminating the pressure drop.

Yet another object of the invention is directed to the ease in which the valve may be repaired. The handle is removed with a threaded fastener and the lid may be removed using four of the attaching screws as jack screws into threaded holes separating the lid evenly with no damage to either lid or body. A dowel pin properly indexes the lid onto the body for ease of reassembly. The protective coating on the diverter may be stripped off and reapplied if necessary.

A further object of the invention is the use of adapters on each port. Theses adapters permit each user to select the type of hose connection applicable in his own firefighting apparatus and change size or type at a later date without the necessity of replacing the entire valve. Further, these adapters may be easily replaced if damage occurs. An o-ring seal compresses against the body such that the attaching threads are isolated from the water inside the valve.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment illustrating the valve connected to a fire hydrant with two hoses directed to a pumper apparatus marked D and S and a smaller line for a firefighter F, to quench the fire.

FIG. 2 is a front view of the preferred embodiment with the handle positioned in the hydrant to firefighter hose position.

FIG. 3 is a right side view of the preferred embodiment in the same valve position as above.

FIG. 4 is a cross sectional view taken along lines 4—4 of FIG. 2 with the valve positioned to feed the firefighter's hose.

FIG. 5 is a cross sectional view taken along lines 5—5 of FIG. 2 with the valve positioned inbetween ports illustrating the make-before-break condition during manual rotation of the valve.

FIG. 6 is a cross sectional view taken along lines 6—6 of FIG. 2 with the valve positioned to feed the flow to the pumper first and then on to the firefighter's hose.

FIG. 7 is a partial isometric view of the handle completely removed from the invention for clarity.

FIG. 8 is a top view of the lid completely removed from the invention for clarity.

FIG. 9 is a bottom view of the lid completely removed from the invention for clarity.

FIG. 10 is a right side view of the lid shown broken away to the centerline and also completely removed from the invention for clarity.

FIG. 11 is a front view of the diverter completely removed from the invention for clarity.

FIG. 12 is a right side view of the diverter completely removed from the invention for clarity.

FIG. 13 is a cross sectional view taken along lines 13—13 of FIG. 12 with a section partially cut away to illustrate the o-ring groove.

FIG. 14 is a front view of the valve body completely removed from the invention for clarity.

FIG. 15 is a top view of the valve body completely removed from the invention for clarity.

FIG. 16 is a cross section view taken along lines 16—16 of FIG. 14.

FIG. 18 is a cross sectional view taken along lines 18—18 of FIG. 17.

BEST MODE FOR CARRYING OUT THE INVENTION

Figure 17:
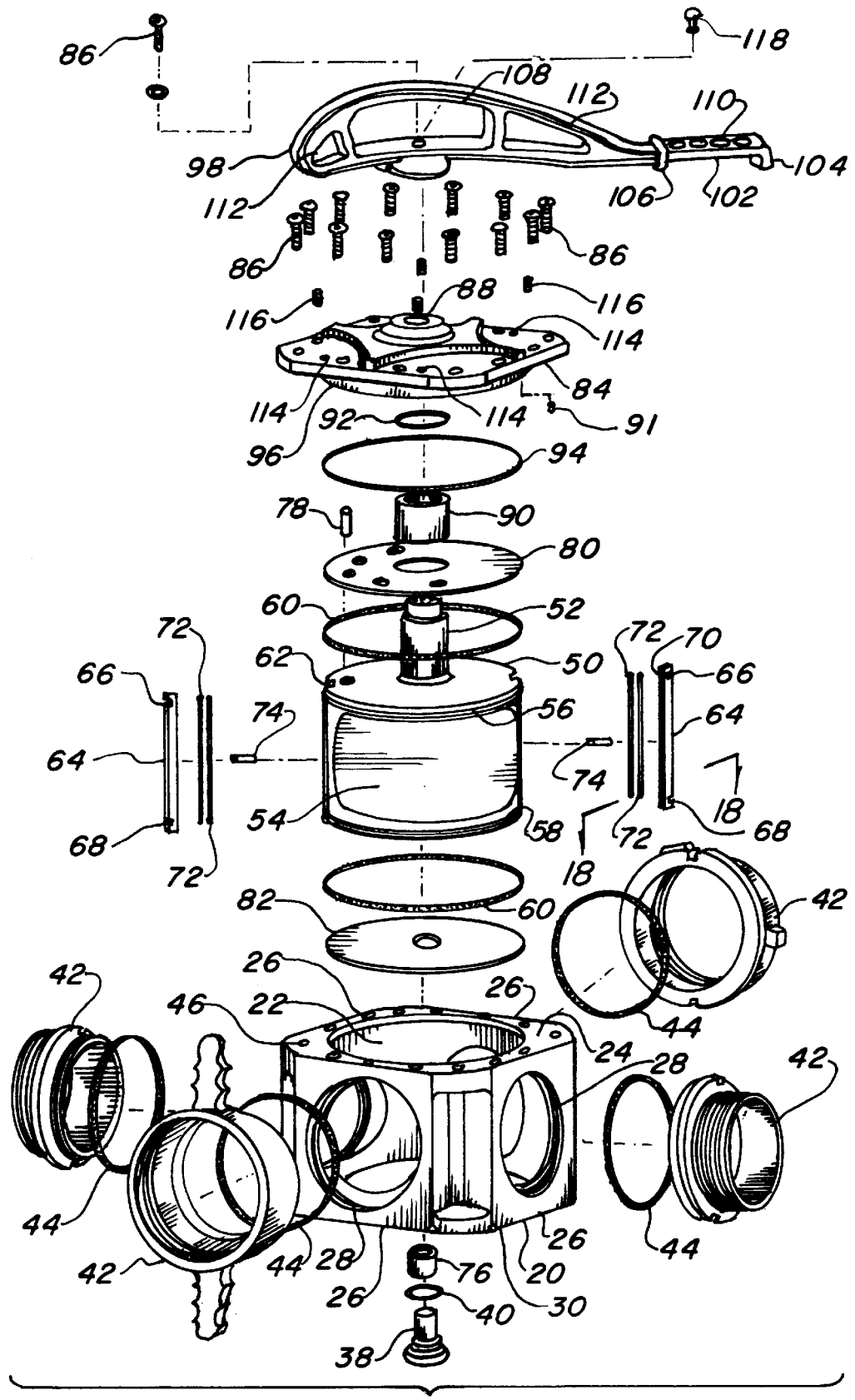
FIG. 17 is a exploded view of the preferred embodiment.

The preferred embodiment, as shown in FIGS. 1–18, is comprised of a valve body 20 that includes a circular well chamber 22, a open top 24 and four sides 26 each having a round orifice 28 penetrating through into the chamber 22. The body 20 is basically square making each side identical. An enclosed bottom 30 having a downwardly extending circular rib 32 completes the basic structure of the body. The body 20 is fabricated from an aluminum billet preferably 6061-T6 alloy, however, other materials may be used. The square-shaped body 20 has radially mitered corners 34 each having a recess 36 for gripping and lightening the structure. The body bottom 30 incorporates an upstanding pivot post 38 in the center with a pivot post o-ring 40 disposed thereon for sealing.

Each orifice 28 in the body 20 is threaded to receive a hose adapter 42, as shown in FIG. 17. The adapters connect the orifice to a hose receiving threaded connection common within firefighting equipment. Many different sizes and configurations are presently used and the adapters fill the need for specialization without the necessity of requiring different valves for each agency or municipality. It should be noted that FIG. 17 illustrates three different varieties of adapters however, a myriad of other styles and diameters could be easily incorporated in the invention. Preferably these adapters 42 are made of aluminum, however other material may also be used, in any case an adapter o-ring 44 provides the seal to the body 20. While the adapters 42 are well known in the art and are presently in use they all have in common threads on opposed sides, one threadably mating with the female threads in the orifice 28 of the valve body 20 and the other mating with male or female threads on the appropriate hose as illustrated in FIGS. 1 and 17. The o-ring 44 stretchably engages a groove in the adapter 42 outward of the threads as is customarily utilized in adapters of this type well known to practitioners in the art. Since hoses may include male or female connections, therefore adapters are normally used in firefighting to mate with available equipment. A number of threaded holes 46 are included on the periphery of the top 24 and a recessed register 48 is included on the top edge of the chamber 22.

A cylindrical diverter 50, as illustrated in FIGS. 4–6, 11–13 and 17, is rotatably disposed within the well chamber 22 and includes an upwardly extending stem 52, and a pair of opposed hollow cavities 54 shaped like an hourglass. Each cavity 54 is in simultaneous alignment with at least two separate orifices 28 providing an unobstructed flow path therebetween. FIGS. 4–6 illustrate this relationship with alpha "H" designating the hydrant connector, "F" the firefighter's hose, "S" the pumper's suction or low pressure hose and "D" the pumpers discharge or high pressure hose. It should be noted that the above figures are shown less adapters 42 for clarity. FIG. 4 illustrates the initial hook up of the firefighter's hose to the hydrant, with the flow from "H" to "F" and the other two shut off permitting hook-up to the pumper.

FIG. 5 illustrates the changeover mode where the diverter is in its intermediate position and all four orifices 28 are in communication. Thus, permitting the firefighter's hose to have continual flow during the changeover and the pumper to have a head of water at the suction of the pump.

FIG. 6 depicts the final position where all of the flow is directed to the pumper and the firefighter's hose receives full pressure and flow from the pumping apparatus.

The diverter 50 includes a top diverter o-ring groove 56 and a diverter bottom o-ring groove 58 near the cavities 54, as shown in FIGS. 11, 12 and 17 each containing a diverter o-ring 60. This arrangement seals the top and bottom of the diverter to the chamber 22. The diverter 50 further contains a pair of opposed wiper recesses 62 at right angles to the grooves 56 and 58, which are located between the hollow cavities 54 as depicted in FIGS. 4–6 and 17. The wiper recesses 62 each receive a wiper 64, illustrated in FIG. 17, for rotatably sealing the diverter 50 to the body 20. The diverter 50 is cast out of aluminum and the body 20 is made from an aluminum billet. The diverter 50 is then encapsulated in a thermoplastic material such as teflon, delrin or nytril to eliminate any metal to metal contact and extend its service life as well as eliminating corrosion in the form of oxidization of the aluminum surface.

Each wiper 64 has a top o-ring groove 66 and a bottom o-ring groove 68. On an inside surface, the wiper also has a pair of longitudinal grooves 70, as depicted in FIG. 18. The outside surface of the wiper 64 is radiused to conform to the shape of the chamber 22 in the body 20. The wipers 64 are fabricated of a hard thermoplastic material and two silicone plastic longitudinal seal cords 72 form a resilient linear seal as they are imbedded into the longitudinal grooves 70 in the back side of the wiper 64. The thermoplastic material has sufficient tolerance such that the water pressure exerted on the side of the wiper pushes against the cords 72 to facilitate a water tight seal. Further pressure on the back of the wiper forces the radiused front face into intimate contact with the chamber 22 of the body 20. The intersection of the wiper top and the bottom o-ring grooves 66 and 68 and the diverter top and bottom o-ring grooves 56 and 58 is critical in the integrity of the seal, however, tests show that the thermal expansion has not affected the closure and the square shaped o-rings 60 in the diverter grooves function appropriately at all water pressures and flows. A wiper locating pin 74 pressed into the diverter 50 and wiper 64, maintain each wiper in the vertical direction.

The diverter 50 further contains a diverter pivot bushing 76, preferably of sintered bronze, pressed into a bore in the center of the diverter bottom for positioning the diverter upon the pivot post 38 centering the diverter in the chamber 22 and permitting free rotation. A handle rotation stop pin 78 is inserted into a hole in the top of the diverter 50, as illustrated in FIGS. 11 and 17, for limiting handle rotation. An upper washer 80 and a lower washer 82 are disposed immediately above and below the diverter 50 to facilitate manual rotation, function as thrust washers, form a seal and protect the diverter from wear. The upper and lower washers 80 and 82 are preferably constructed of polytetra fluoro ethyelene or known commonly by its registered tradename as TEFLON®.

A lid 84, fabricated of the same material as the body 20, is attached to the top 24 of the body with a number of attaching screws 86, as shown in FIG. 17. A single indexing dowel pin 91 assures correct orientation of the lid 84 to the body 20, as shown in FIGS. 10 and 17. The lid 84 has a bore 88 in the center to provide clearance for the diverter stem 52 and a lid bushing 90, preferably of sintered bronze, is pressed into the bore 88 to reduce the friction during rotation. A lid o-ring 92 is positioned over the stem 52 to create a liquid tight seal. The lid 90 encloses the diverter 50 in the body 20 and a seal is made therebetween with a valve top o-ring 94 pressed between a downwardly extending step 96 integral with the lid 84 and the recessed register 48 in the chamber 22 of the body 20.

A handle 98 is affixed upon the diverter stem 52, as shown in FIGS. 1–3, and when it is manually rotated the diverter 50 revolves reversing communication between opposed pairs of orifices 28 located in the body sides 26. It should be noted from the illustration of FIGS. 4–6 that fluid flow is not interrupted to the firefighter's hose (designated F) during the rotation changing flow from the hydrant to the pumping apparatus (designated D). As depicted in FIGS. 9 and 10, the handle moves only 90 degrees as limited by the handle rotation stop pin 78 in the diverter 50 and a handle stop recess 100 formed into the underside of the lid 84. The 90 degree rotation with its corresponding communication between the orifices 28 provides a make-before-break sequence which assures a continuous flowpath through the valve when the handle 98 is rotated by hand.

The handle 98 is ergonomically shaped and balanced as shown in FIG. 7, also all corners are smooth and have radiused edges. The grip portion 102 has a hooked end 104 and a raised hilt 106 for positive hand positioning. The handle 98 further contains a hand opening 108 directly aligned with the center of balance of the valve and grip lightening holes 110 are included in the grip portion. Two openings 112 are placed in the handle adjacent to the hand opening 108 for reducing the weight of the handle. The handle 98 may be cast aluminum, forged aluminum, or machined from aluminum bar stock. While aluminum is the preferred material other materials may be used in construction of the handle. The handle is attached to the diverter stem 52 with one or more attaching screws 86 with the head or heads shielded by a protective cover 118.

In order to facilitate easy removal of the lid 84 from the body 20, four threaded bores 114 with steel inserts 116 are equally spaced on the periphery of the lid. For lid removal all of the threaded attaching screws 86 are removed and four fasteners are inserted into the threaded bores 114 and tightened drawing the lid 84 away from the body 20 in a linear manner.

It should be noted that the entire valve, including the adapters 42, is made of solid aluminum, except the hardware, screws, washers, o-rings, screw covers, and bushings. This aluminum material in each component is protected by a surface treatment known as an anodize process. During the anodizing process, hard durable coating is added that inhibits corrosion, such a coating is sold under the trademark DURASHIELD®. This surface treatment is hard, durable and inhibits corrosion.

The operation of the valve has been discussed previously in detail which is basically consists of:

(1) attaching the valve to the hydrant with the appropriate adapter 42,
(2) connecting the fire apparatus hose, and
(3) switching flow direction by rotating the handle 98, 90 degrees.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

I claim:

1. A fire hydrant multi-port diverting valve comprising:
a) a valve body having a circular well chamber therein, defined by an open top, four sides each side having an orifice in communication with the well chamber and a enclosed bottom,
b) a cylindrical diverter rotatably disposed within the body well chamber, said diverter having an upwardly extending stem and a pair of opposed radial hollow cavities in hourglass shape in simultaneous alignment with at least two separate orifices providing a flowpath therebetween,
    said diverter having a top diverter o-ring groove and a bottom diverter o-ring groove in close proximity to the cavities also said diverter having a pair of opposed wiper recesses at right angles to said grooves and between the radial hollow cavities for hermetically sealing the valve,
    said top and bottom o-ring grooves each have a diverter o-ring disposed therein and said wiper recess each having a wiper disposed therein for rotatably sealing the diverter to the body for sealing,
    said wipers having a top o-ring groove and a bottom o-ring groove also each having a pair of longitudinal grooves on an inside surface with a resilient longitudinal seal disposed within for sealing the diverter to the body between the cavities,
c) a lid having a bore therethrough providing clearance for the diverter stem with said lid attached to the top of the body enclosing the diverter therein, and
d) a handle affixed upon the lid penetrating diverter stem, such that when said handle is manually rotated the diverter revolves reversing communication between opposed pairs of orifices within the body sides while continuing fluid communication until the diverter is rotated a complete 90 degrees from a starting point providing a make-before-break sequence continuous flowpath through the valve when actuated by hand.

2. A fire hydrant multi-port diverting valve comprising:
a) a valve body having a circular well chamber therein, defined by an open top, four sides each side having an orifice in communication with the well chamber and a enclosed bottom, said body is square in shape with smooth radially mitered corners, said corners each having a recess for lightening the valve weight and ease of gripping during transportation and attachment to a fire hydrant,
b) a cylindrical diverter rotatably disposed within the body well chamber, said diverter having an upwardly extending stem and a pair of opposed radial hollow cavities in hourglass shape in simultaneous alignment with at least two separate orifices providing a flowpath therebetween,
c) a lid having a bore therethrough providing clearance for the diverter stem with said lid attached to the top of the body enclosing the diverter therein, and
d) a handle affixed upon the lid penetrating diverter stem, such that when said handle is manually rotated the diverter revolves reversing communication between opposed pairs of orifices within the body sides while continuing fluid communication until the diverter is rotated a complete 90 degrees from a starting point providing a make-before-break sequence continuous flowpath through the valve when actuated by hand.

3. A fire hydrant multi-port diverting valve comprising:

a) a valve body having a circular well chamber therein, defined by an open top, four sides each side having an orifice in communication with the well chamber and a enclosed bottom, b) a cylindrical diverter rotatably disposed within the body well chamber, said diverter having an upwardly extending stem and a pair of opposed radial hollow cavities in hourglass shape in simultaneous alignment with at least two separate orifices providing a flowpath therebetween, c) a lid having a bore therethrough providing clearance for the diverter stem with said lid attached to the top of the body enclosing the diverter therein, and d) a handle affixed upon the lid penetrating diverter stem, such that when said handle is manually rotated the diverter revolves reversing communication between opposed pairs of orifices within the body sides while continuing fluid communication until the diverter is rotated a complete 90 degrees from a starting point providing a make-before-break sequence continuous flowpath through the valve when actuated by hand, said handle is ergonomically shaped and balanced having radiused edges, a grip portion with a hooked end and a hilt for positive hand positioning, said handle having a hand opening directly aligned with a center of balance of the valve, said grip portion having grip lightening holes therethrough and a plurality of handle lightening openings adjacent to the hand opening for reducing the weight of the handle.

4. A fire hydrant multi-port diverting valve comprising:

a) a valve body having a circular well chamber therein, defined by an open top, four sides each side having an orifice in communication with the well chamber and a enclosed bottom, b) a cylindrical diverter rotatably disposed within the body well chamber, said diverter having an upwardly extending stem and a pair of opposed radial hollow cavities in hourglass shape in simultaneous alignment with at least two separate orifices providing a flowpath therebetween, c) a lid having a bore therethrough providing clearance for the diverter stem with said lid attached to the top of the body enclosing the diverter therein, and d) a handle affixed upon the lid penetrating diverter stem, such that when said handle is manually rotated the diverter revolves reversing communication between opposed pairs of orifices within the body sides while continuing fluid communication until the diverter is rotated a complete 90 degrees from a starting point providing a make-before-break sequence continuous flowpath through the valve when actuated by hand, and e) a plurality of threaded fasteners attaching the lid to the body, said lid also having at least four threaded bores for jacking the lid from the body using the threaded fasteners.

* * * * *